United States Patent

Tabb

[11] Patent Number: 5,578,681
[45] Date of Patent: *Nov. 26, 1996

[54] CURABLE ELASTOMERIC BLENDS

[75] Inventor: David L. Tabb, Wilmington, Del.

[73] Assignee: E. I. Du Pont de Nemours and Company, Wilmington, Del.

[*] Notice: The term of this patent shall not extend beyond the expiration date of Pat. No. 5,412,034.

[21] Appl. No.: 415,868

[22] Filed: Apr. 3, 1995

Related U.S. Application Data

[63] Continuation-in-part of Ser. No. 143,262, Oct. 26, 1993, Pat. No. 5,412,034.

[51] Int. Cl.$^6$ .............................. C08J 3/24; C08L 27/22; C08L 33/04; C08L 31/04
[52] U.S. Cl. .................. 525/194; 525/200; 525/199; 525/193; 525/195; 524/520
[58] Field of Search ................................ 525/199, 193, 525/194, 200, 195

[56] References Cited

U.S. PATENT DOCUMENTS

| | | | |
|---|---|---|---|
| 4,035,565 | 7/1977 | Apotheker et al. | 526/247 |
| 4,251,399 | 2/1981 | Tomoda et al. | 260/4 R |
| 4,275,180 | 6/1981 | Clarke | 525/173 |
| 5,008,340 | 4/1991 | Guerra et al. | 525/193 |
| 5,053,450 | 10/1991 | Coran | 524/506 |
| 5,095,072 | 3/1992 | Kobayashi et al. | 525/199 |
| 5,109,071 | 4/1992 | Johnson et al. | 525/199 |
| 5,206,293 | 4/1993 | Sakai et al. | 525/194 |
| 5,430,103 | 7/1995 | Ohata et al. | 525/194 |

FOREIGN PATENT DOCUMENTS

| | | |
|---|---|---|
| 230669 | 8/1987 | European Pat. Off. . |
| 3841699 | 6/1989 | Germany . |
| 57-135844 | 8/1982 | Japan . |
| 63-281311 | 11/1988 | Japan . |
| 1152016 | 6/1989 | Japan . |

OTHER PUBLICATIONS

Eric W. Thomas et al., "Advanta™ A New Intermediate Performance Specialty Elastomer", Oct. 11–14, 1994, Paper No. 94, pp. 1–29.

ASTM–Designation D 2000–80–Standard Classification System for Rubber Products in Auto. Applications–pp. 320–323 & 366.

*Primary Examiner*—Carman J. Seccuro, Jr.

[57] ABSTRACT

Curable elastomeric blends of fluoroelastomer and ethylene copolymer elastomer in which at least one of the fluoroelastomer and ethylene copolymer elastomer contains a cure site monomer.

13 Claims, No Drawings

1

CURABLE ELASTOMERIC BLENDS

CROSS-REFERENCE TO RELATED APPLICATIONS

This is a continuation-in-part of U.S. patent application Ser. No. 08/143,262, filed Oct. 26, 1993, now U.S. Pat. No. 5,412,034.

BACKGROUND OF THE INVENTION

There are significant differences between the heat resistance and overall fluid resistance of fluoroelastomers and hydrocarbon elastomers. There are also significant cost differences between the two classes of elastomers. An elastomer approaching the performance characteristics of fluoroelastomers and the cost of hydrocarbon elastomers has long been desired. Previous attempts to meet this need by blending fluoroelastomers and hydrocarbon elastomers have met with limited success, since the two classes of elastomers are incompatible.

Tomoda et al, in U.S. Pat. No. 4,251,399, disclose a co-crosslinkable, peroxide-curable blend of iodine-containing fluoroelastomer and hydrocarbon elastomer. This reference teaches that conventional fluoroelastomers are crosslinkable with organic peroxides, but that practical use of them has not been made because of their inferior crosslinkability.

Sakai et al, in U.S. Pat. No. 5,206,293, disclose a rubber composition obtained by subjecting a mixture of fluoroelastomer, polyethylene or an ethylene copolymer, and organic peroxide to reaction while imparting shearing deformation to the mixture. This procedure is to crosslink the ethylenic resin but not the fluoroelastomer. To this end, the amount of peroxide used is no more than 5 phr. The rubber composition can subsequently be crosslinked by adding a crosslinking agent for the fluoroelastomer. It is taught that, when a crosslinking agent for the fluoroelastomer is compounded with a mere mixture of fluoroelastomer and ethylenic resin (which may contain filler and the like), it is impossible to obtain an extrudate of complex shape. There is no disclosure of simultaneous crosslinking of fluoroelastomer and elastomeric ethylenic resin with desirable results.

SUMMARY OF THE INVENTION

The present invention provides a co-curable blend of elastomeric fluoropolymers and hydrocarbon polymers which provides excellent physical properties in the cured state.

Specifically, the instant invention provides a co-curable elastomeric blend comprising (a) at least about 5%, by weight of components (a) and (b), of at least one elastomeric fluoropolymer having at least about 45 weight % fluorine, and (b) at least about 5%, by weight of components (a) and (b), of at least one elastomeric copolymer comprising
  (1) ethylene and
  (2) at least one polar comonomer selected from the group consisting of alkyl acrylates, alkyl methacrylates, and vinyl esters wherein the polar comonomer comprises at least 55–80% by weight of the copolymer (b);

wherein at least one of (a) and (b) contains about from 0.1 to 10.0% by weight of at least one cure site monomer; provided that if additional elastomeric polymer is present in concentrations exceeding 2 parts by weight based on 100 parts of the combined weight of (a) and (b), the additional elastomeric polymer has heat resistance surpassing the requirements for Type C rubber materials according to ASTM D-2000.

DETAILED DESCRIPTION OF THE INVENTION

A wide variety of elastomeric fluoropolymers or fluoroelastomers can be used in this invention. They are copolymers of at least one fluorinated monomer, but may incorporate monomers containing no fluorine. These polymers often incorporate vinylidene fluoride ($VF_2$) as a monomer. The most common fluoroelastomers are copolymers of $VF_2$ with hexafluoropropylene (HFP) and optionally tetrafluoroethylene (TFE). However, the use of other fluoromonomers and of monomers that do not contain fluorine is well known. Other monomers that can be used include chlorotrifluoroethylene (CTFE), hydrocarbon olefins such as ethylene (E) or propylene (P), and perfluoro(alkyl vinyl) ether (PAVE) having the formula $CF_2\!=\!CFO(R_f'O)_nR_f$ wherein n is 0–5, $R_f$ is a perfluoroalkyl group of 1–6 carbon atoms, and $R_f'$ is a linear or branched perfluoroalkylene group of 2–6 carbon atoms. Examples of $R_f'$ include —$CF_2CFX$— wherein X is F or $CF_3$. A preferred PAVE is perfluoro(methyl vinyl) ether (PMVE). Fluoroelastomers incorporating such monomers include TFE/$VF_2$/PMVE, E/TFE/PMVE, and TFE/P copolymers.

The fluoroelastomers can include cure site moieties derived from small concentrations of cure site monomers in addition to the primary monomers described above to achieve peroxide-curable systems. Cure site monomers may be present in concentrations up to about 3 mol %. A preferred class of cure site monomers are bromine-containing compounds which provide about 0.05–2.0 wt %, preferably about 0.1–1.0 wt %, and most preferably 0.15–0.6 wt % bromine in the polymer when the monomers are incorporated in the fluoroelastomer in concentrations up to about 3 mol %. Such monomers can include, for example, bromine-containing olefins such as bromotetrafluorobutene and bromotrifluoroethylene, and brominated fluorovinyl ethers such as $CF_2\!=\!CF\text{—}O\text{—}CF_2\text{—}CF_2Br$ and $CF_3\text{—}CH_2\text{—}O\text{—}CF\!=\!CFBr$. Additionally, chain transfer or molecular weight regulating agents can be used in the polymerization reaction to introduce desirable fragments into the polymer for curing purposes. Such agents include iodine-containing compounds that result in bound iodine at one or both ends of the polymer molecule. Methylene iodide, 1,4-diiodoperfluoro-n-butane, and 1,6-diiodo-3,3,4,4-tetrafluorohexane are representative of such agents. Iodine or bromine can be introduced at end positions of the polymer chain in other ways as described in Albano et al., U.S. Pat. No. 5,173,553, using alkali metal halides. When iodine-containing compounds such as those mentioned above are used in polymerization reactions to introduce iodine into the polymer, the resulting concentration of iodine in the fluoroelastomer is at least 0.001 wt %, desirably at least about 0.05 wt %, and preferably at least about 0.1 wt %.

Representative peroxide-curable fluoroelastomers containing a cure site monomer are described in Apotheker et al., U.S. Pat. No. 4,035,565; Albin, U.S. Pat. No. 4,564,662; Arcella et al., U.S. Pat. No. 4,745,165; Moore, U.S. Pat. No. 4,694,045; Moore, U.S. Pat. No. 4,948,852; Moore, U.S. Pat. No. 4,973,633; and Albano et al., U.S. Pat. No. 5,173,553.

With or without a cure site monomer that responds to peroxide, many of the foregoing fluoroelastomers can be cured with amine curing agent systems or polyol curing agent systems, as is well known in the art. This is particularly so for fluoroelastomers containing VF$_2$ and HFP.

The elastomeric ethylene copolymers used in this invention are peroxide-curable copolymers of ethylene and at least one other monomer. Such monomers include (a) C$_1$–C$_8$ alkyl esters of acrylic or methacrylic acid or (b) vinyl esters of a C$_2$–C$_4$ carboxylic acid. The copolymers can additionally contain alpha, beta-unsaturated carboxylic acids of 3–12 carbon atoms selected from the group consisting of monocarboxylic acids, dicarboxylic acids, and monoesters of dicarboxylic acids. These additional monomers can render the ethylene copolymer elastomer amine-curable. Such copolymers are well-known in the art and a large number of such copolymers are available commercially.

The Mooney viscosity of elastomeric ethylene copolymers that can be used in this invention is about 10–120, preferably 10–50 (ASTM D-1646, 100° C., 1 min preheat, viscosity measured at 4 min).

The ethylene content of the copolymers is about 20–55 wt % of the polymer, preferably 20–45 wt %.

The alkyl acrylate or the vinyl ester comonomers comprise about 45–80 wt % of the copolymer, preferably about 55–80 wt %. Alkyl acrylates suitable for use in the copolymers include C$_1$–C$_8$ alkyl esters of acrylic acid, for example, the methyl, ethyl, isobutyl, hexyl, and 2-ethylhexyl esters. Methyl, ethyl, and butyl acrylates are preferred. Methyl acrylate is most preferred. Vinyl esters of carboxylic acids suitable for use in the polymers include vinyl esters of carboxylic acids having 2–8 carbon atoms, for example, vinyl acetate, vinyl propionate, vinyl hexanoate, and vinyl 2-ethylhexanoate. Vinyl acetate is preferred.

When used, the alpha, beta-unsaturated mono-or dicarboxylic acids are present in an amount sufficient to provide about 0.1–10 wt %, preferably 0.5–5.0 wt % of carboxylate groups. Suitable alpha, beta-unsaturated mono- or dicarboxylic acids include those having 3–12 carbon atoms, for example, monocarboxylic acids such as acrylic acid, methacrylic acid, and ethacrylic acid; dicarboxylic acids such as itaconic acid, maleic acid and fumaric acid; and monoesters of dicarboxylic acids such as ethyl hydrogen maleate, ethyl hydrogen fumarate, and 2-ethylhexyl hydrogen maleate. Acrylic acid, methacrylic acid, and ethyl hydrogen maleate are preferred.

Such copolymers are generally prepared by continuous copolymerization of ethylene and the comonomers in a stirred reactor in the presence of at least one free-radical initiator at temperatures of about from 120° C. to 300° C. and at pressures of about from 130 to 310 MPa. The most effective initiators have half lives of 0.1–1.0 sec at the reactor temperature, for example, lauryl peroxide, di-t-butyl peroxide, t-butyl peracetate, di(sec-butyl)peroxy dicarbonate, t-butyl peroxy neodecanoate, and t-amyl peroxy pivalate. Optionally, the copolymers are prepared in the presence of about 2–25 wt % methanol or acetone so that reactor fouling is decreased or eliminated, as disclosed by Hatch et al in U.S. Pat. No. 5,028,674 and by Statz in U.S. Pat. No. 5,027,593. Following discharge of polymer from the reactor, viscosity can be increased by subjecting the polymer to post-reactor processing as disclosed, for example, by Fisher et al. in U.S. Pat. No. 5,194,516 and by Harrell in U.S. Pat. No. 5,214,108.

Representative examples of specific ethylene copolymers which can be used in the present invention include ethylene/ methyl acrylate, ethylene/methyl methacrylate, ethylene/ ethyl acrylate, ethylene/ethyl methacrylate, ethylene/butyl acrylate, ethylene/2-ethylhexyl methacrylate, ethylene/butyl acrylate/carbon monoxide, ethylene/butyl acrylate/glycidyl methacrylate, ethylene/butyl acrylate/acrylic acid, ethylene/ vinyl acetate/glycidyl methacrylate, ethylene/vinyl acetate/ methacrylic acid, ethylene/vinyl propionate/glycidyl methacrylate, and ethylene/vinyl acetate/acrylic acid. Preferably the copolymers contain copolymerized units of C$_1$–C$_8$ alkyl acrylates or methacrylates. The preceding list illustrates copolymers that are peroxide-curable but not amine-curable, or not readily amine-curable.

Further representative examples of specific ethylene copolymers which can be used in the present invention include ethylene/methyl acrylate/carbon monoxide, ethylene/butyl acrylate/carbon monoxide, ethylene/vinyl acetate/ carbon monoxide, ethylene/vinyl butryate/carbon monoxide, ethylene/methyl acrylate/ethyl hydrogen maleate, ethylene/methyl acrylate/methacrylic acid, ethylene/acrylic acid/vinyl acetate, ethylene/butyl acrylate/acrylic acid, ethylene/vinyl acetate/methacrylic acid, ethylene/fumaric acid/ methyl acrylate, ethylene/ethyl hydrogen maleate/vinyl acetate, ethylene/ethyl hydrogen maleate/carbon monoxide/ methyl acrylate, ethylene/methacrylic acid/carbon monoxide/vinyl acetate, and ethylene/ethyl hydrogen maleate/carbon monoxide/vinyl acetate. This listing illustrates copolymers that are amine-curable as well as peroxide-curable.

The blends of this invention can be cured with a curing agent system that is effective for both components of the blend, i.e., effective for both the fluoroelastomer component and the ethylene copolymer elastomer component. Peroxide curing agent systems can be used if the fluoroelastomer contains a cure site monomer such as the preferred bromine-containing monomer. Similarly, amine systems can be used if the ethylene copolymer elastomer contains units of an alpha, beta-unsaturated carboxylic acid and if the fluoroelastomer is amine-curable, such as those containing VF$_2$ and HFP as discussed above.

If the fluoroelastomer and the ethylene copolymer elastomer are each peroxide-curable and amine-curable, then a mixed peroxide and amine curing agent system can be used. Optionally, a curing agent system that is effective only for one blend component can be used in addition to a curing agent system that is commonly effective for both blend components. For example, a polyol curing agent system that is effective for fluoroelastomers only can be used along with a peroxide curing agent system in a blend of peroxide-curable components. In the same way, an amine curing agent system that is effective for only one of the components can be used along with a peroxide curing agent system in a blend of peroxide curable components.

Peroxides used for curing should be those that decompose rapidly within the temperature range 150°–250° C. Representative examples of organic peroxides that may be used include dicumyl peroxide, t-butyl perbenzoate, benzoyl peroxide, t-butyl peracetate, 1,1-di(t-butylperoxy)3,3,5-trimethyl cyclohexane, 2,5-dimethyl-2,5 ,di-(t-butylperoxy)hexane, 2,5-dimethyl-2,5,di-(t-butylperoxy)hexyne, n-butyl-4, 4-bis(t-butylperoxy valerate), and di[1,3-dimethyl-3-(t-butylperoxy)butyl]carbonate. Use of a combination of more than one peroxide is advantageous in certain circumstances, although generally one peroxide is used alone. Typically, about 0.5–5 phr (parts per hundred parts of polymer resin, by weight) of peroxide are used. The peroxide can be adsorbed on an inert carrier, the weight of which is not included in the range stated for the peroxide.

A coagent, a polyunsaturated compound which is capable of cooperating with the peroxide to provide a useful cure, is usually used as part of a peroxide curing agent system. Such compounds include triallyl cyanurate, triallyl isocyanurate, trimethallyl isocyanurate, diallyl maleate, high vinyl low molecular weight butadiene, N,N'-m-phenylene dimaleimide, pentaerythritol triacrylate, pentaerythritol trimethacrylate, trimethylolpropane triacrylate, and trimethylolpropane trimethacrylate. Use of such coagents in curing or crosslinking processes is well-established in the art. More than one coagent may be used, but generally one coagent is used alone. The amount of coagent can be about 0.1–10 phr, about 0.5–5 phr being preferred.

Amine curing agents that can be used with the blends of this invention are usually diamines, but amines having higher amine functionality are also contemplated, and include compounds such as hexamethylenediamine, hexamethylenediamine carbamate, tetramethylenepentamine, hexamethylenediaminecinnamaldehyde adduct, hexamethylenediaminedibenzoate salt, and the like. Aromatic amines can also be used as curing agents. More than one amine curing agent may be used, but generally one amine is used alone. Amine curing agent concentration is usually about 0.1–5 phr.

An accelerator can be used in conjunction with an amine curing agent, as well-known in the art. Suitable accelerators for amine curing agent systems include quaternary ammonium compounds, quaternary phosphonium compounds, penta-substituted guanidines and salts thereof, trisubstituted amidines, cyclic polyethers, and open-chain polyethers. Accelerator concentration is usually about 0.1–10 phr.

Polyol curing agent systems well-known in the art can optionally be used in the practice of this invention. Such polyols, polyhydroxylic aromatic compounds, include di-, tri-, and tetrahydroxybenzenes, naphthalenes and anthracenes, as well as bisphenols. Hexafluoroisopropylidene-bis(4-hydroxybenzene) (Bisphenol AF) is one of the most useful polyol curing agents. Hydroquinone is also very useful. Polyol curing agent concentration can be about 0.1–5 phr, with about 0.6–2 phr being preferred. An accelerator is usually used in conjunction with polyol curing agents. Quaternary ammonium compounds, quaternary phosphonium compounds, penta-substituted guanadines and salts thereof, and trisubstituted amidines are especially useful accelerators for polyol curing agent systems. Accelerator concentration can be about 0.1–2 phr for polyol cure.

Optionally, at least one metal compound selected from divalent metal oxides or divalent metal hydroxides can be incorporated into the co-curable elastomeric polymer blends of this invention. Representative metal compounds include the oxides and hydroxides of magnesium, zinc, calcium, and lead. Magnesium oxide and calcium hydroxide are particularly useful in conjunction with peroxide curing systems. A metal salt of a weak acid can also be incorporated along with the oxide and/or hydroxide. Representative salts of weak acids include stearates, benzoates, carbonates, oxalates, and phosphites of barium, sodium, potassium, lead, and calcium. The amount of metal compound typically used is 0.02–10 parts by weight per 100 parts by weight of elastomeric polymer blend.

Optionally, at least one organic base can be incorporated into the co-curable elastomeric polymer blends of this invention. Preferred organic bases are strong bases, having pKa of at least about 10 and desirably at least about 12. Representative of such bases are octadecylamine, available from Akzo Chemicals, Inc. as Armeen® 18-D, and 1,8-bis-(dimethylamino)napthalene, available from Aldrich Chemical Company as Proton Sponge®. When used, the amount of organic base is typically 0.02–5 parts by weight per 100 parts by weight of elastomeric polymer blend.

The elastomeric blends can also contain conventional fillers such as carbon black, clay, silica and talc. Other fillers, pigments, antioxidants, stabilizers and the like can also be used. It is particularly advantageous to add carbon black to the fluoroelastomer to increase its modulus. Usually amounts of about 5–75 parts by weight per 100 parts by weight of the elastomeric polymers are used. The particular amount will be determined from the particle size of the carbon black and the desired hardness of the cured composition.

While it is contemplated that fluoroelastomer and ethylene copolymer elastomer together should constitute the principal polymeric components of the co-curable elastomeric blends of this invention, one skilled in the art will recognize the possibility of including other polymers in the blend, including other co-curable elastomers. However, if present in more than trivial concentration, such as more than 2 parts by weight based on 100 parts by weight of combined fluoroelastomer and ethylene copolymer elastomer, such other co-curable elastomer must be heat resistant. By "heat resistant" it is meant that the other co-curable elastomer has heat resistance better than defined for Type C rubber materials according to ASTM D-2000. That is, the other co-curable elastomer will satisfy the limitation on property changes after heat aging at some temperature above 125° C. for 70 hr according to ASTM D-573. In particular, any other co-curable elastomer present in the blend in concentration exceeding 2 parts by weight per 100 parts by weight of the combined fluoroelastomer and ethylene copolymer should have heat resistance surpassing the requirements for Type C rubber materials. It is not necessary that the other co-curable elastomer satisfy the requirements for Type D (150° C. heat aging). However, it is preferred that the other co-curable elastomer, if used, satisfy at least Type D requirements.

EXAMPLES

Compositions for each of the Examples and Control Examples described below were prepared by the following general procedure. First, fluoroelastomer and hydrocarbon elastomer were placed in an internal mixer (B Banbury) at a loading factor of 70%. The polymers were mixed until a chart temperature of approximately 77° C. was reached. The polymer mixture was discharged and sheeted out on a two-roll rubber mill. This preliminary blending step was omitted for the controls based on a single elastomer, and for Examples 12 and 13. Then, the polymer mixture and other ingredients of the desired compound were placed in a B Banbury mixer, again at a 70% loading factor. The ingredients were mixed until a chart temperature of approximately 77° C. was reached, and the compound was discharged and sheeted out on a two-roll rubber mill. Slabs (76 mm×152 mm×1.9 mm) and o-rings (25.4 mm inside diameter×3.5 mm thick) for measurement of vulcanizate properties were molded using a press cure of 177° C. for 10 min followed by a post cure at 177° C. for 8 hours in a circulating air oven.

Tensile stress-strain properties were measured according to ASTM method D-412. Compression set was measured on o-rings according to ASTM method D-395. Volume change upon exposure to selected fluids was measured according to ASTM method D-471.

Polymers and certain of the curatives used in examples of the invention and controls are identified and defined in Table 1. The components used therein and not previously identified are abbreviated as follows:

BTFB—bromotetrafluorobutene

MA—methyl acrylate

MAME—ethyl hydrogen maleate or maleic anhydride monoethyl ester

Polymer compositions in Table 1 are presented on a weight basis. Patent references are cited for general methods of preparing the polymers used.

TABLE 1

| Identification | Composition, Viscosity, and Reference |
|---|---|
| Fluoroelastomer A | $VF_2$/HFP/TFE/BTFB = 50/28/20/1.7<br>$ML_{1+10}$ = 90 at 121° C.<br>U.S. Pat. No. 4,035,565 |
| Fluoroelastomer B | $VF_2$/TFE/PMVE/BTFB = 34/26/38/1.7<br>$ML_{1+10}$ = 75 at 121° C.<br>U.S. Pat. No. 4,035,565 |
| Fluoroelastomer C | $VF_2$/HFP/TFE = 36/36/28<br>Iodine content = 0.2 wt %<br>$ML_{1+10}$ = 20 at 121° C.<br>U.S. Pat. No. 4,948,852 (cure site monomer omitted) |
| Fluoroelastomer D | $VF_2$/HFP/TFE/BTFB = 50/29/20/0.6<br>Iodine content = 0.2 wt %<br>$ML_{1+10}$ = 20 at 121 C.<br>U.S. Pat. No. 4,948,852 |
| Fluoroelastomer E | $VF_2$/HFP = 60/40<br>$ML_{1+10}$ = 20 at 121° C.<br>U.S. Pat. No. 3,707,529 |
| Fluoroelastomer F | $VF_2$/HFP/TFE copolymer containing iodine Daiel ™ G-902 (Daikin Kogyo) |
| HC elastomer A | E/MA = 29/71<br>$ML_{1+4}$ = 22 at 100° C.<br>U.S. Pat. No. 3,904,588 & 5,194,516 |
| HC elastomer B | E/MA/MAME = 32/63/5<br>$ML_{1+4}$ = 16 at 100° C.<br>U.S. Pat. No. 3,904,588 & 5,194,516 |
| HC elastomer C | Vamac ® ethylene acrylic elastomer, grade N123 (DuPont Company) |
| NBR elastomer | 51 wt % acrylonitrile<br>Nipol ® 1000 X 132 (Zeon Chemicals) |
| Peroxide | 2,5-dimethyl-2,5-di(t-butylperoxy)hexane 45 wt % on inert support (Luperco ® 101XL, Atomchem, Inc.) |
| Curative A | Benzyl triphenylphosphonium chloride 33 wt % in 60/40 $VF_2$/HFP copolymer |
| Curative B | Bisphenol AF 50 wt % in 60/40 $VF_2$/HFP copolymer |

Example 1 and Control A

Fluoroelastomers C and D were blended with hydrocarbon (HC) elastomer A in proportions and with other ingredients as shown in Table 2, molded, cured, and tested following the general procedure outlined above. Test results are also presented in Table 2. Fluoroelastomers C and D contain the same amount of terminal iodine, but D additionally contains a brominated cure site monomer.

The blend with iodo-bromo fluoroelastomer D has significantly better compression set resistance than the blend with iodo fluoroelastomer C. The blend with iodo-bromo fluoroelastomer D also has substantially higher tensile strength.

TABLE 2

Results for Example 1 and Control A

| | A | 1 |
|---|---|---|
| Formulation (wt parts): | | |
| Fluoroelastomer C | 70 | |
| Fluoroelastomer D | | 70 |
| HC elastomer A | 30 | 30 |
| MT carbon black (N-990) | 35 | 35 |
| Zinc oxide | 3.5 | 3.5 |
| Subst'd diphenylamine | 0.7 | 0.7 |
| Triallylisocyanurate | 2.0 | 2.0 |
| Peroxide | 3.5 | 3.5 |
| Vulcanizate Properties: | | |
| Tensile Properties: | | |
| 100% modulus (MPa) | 3.9 | 3.5 |
| Tensile strength (MPa) | 9.5 | 12.8 |
| Elongation at break (%) | 425 | 330 |
| Compression set (%) | | |
| 150° C./70 hr | 39 | 29 |
| Volume change (%) | | |
| ASTM #3 oil, 150° C./70 hr | 13 | 13 |
| Fuel C, 23° C./70 hr | 49 | 50 |

Examples 2–8 and Controls B–C

Fluoroelastomer A was blended with hydrocarbon (HC) elastomer A in proportions and with other ingredients as shown in Table 3, molded, cured, and tested following the general procedure outlined above. Test results are also presented in Table 3. Formulations for Controls B and C are appropriate for fluoroelastomer A and hydrocarbon elastomer A, respectively. Formulations for Examples 2–8 reflect the proportions of fluoroelastomer A and hydrocarbon elastomer A in the blends. As shown in Table 3, useful properties are obtained for this blend of peroxide-curable elastomers over a broad range of blend composition. Note that modulus for all blends is greater than the modulus of either control, and tensile strength for blends rich in fluoroelastomer is also greater than the tensile strength of either control. These improvements are accompanied by only minor reduction in elongation. Volume change in ASTM #3 oil and Fuel C decreases with increasing concentration of fluoroelastomer in the blend.

TABLE 3

Examples 2–8 and Controls B–C

| | B | 2 | 3 | 4 | 5 | 6 | 7 | 8 | C |
|---|---|---|---|---|---|---|---|---|---|
| Formulation (wt parts): | | | | | | | | | |
| Fluoroelastomer A | 100 | 95 | 90 | 80 | 50 | 20 | 10 | 5 | — |
| HC elastomer A | — | 5 | 10 | 20 | 50 | 80 | 90 | 95 | 100 |
| MT carbon black (N-990) | 25 | 25 | 30 | 35 | 45 | 60 | 60 | 65 | 65 |
| Zinc oxide | 3.0 | 3.0 | 3.0 | 3.5 | 4.0 | 4.5 | 5.0 | 5.0 | 5.0 |
| Substituted diphenylamine | 0.6 | 0.6 | 0.6 | 0.7 | 0.8 | 0.9 | 1.0 | 1.0 | 1.0 |

TABLE 3-continued

| | Examples 2–8 and Controls B–C | | | | | | | | |
|---|---|---|---|---|---|---|---|---|---|
| | B | 2 | 3 | 4 | 5 | 6 | 7 | 8 | C |
| Triallylisocyanurate | 2.0 | 2.0 | 2.0 | 2.0 | 2.0 | 2.5 | 2.5 | 2.5 | 2.5 |
| Peroxide | 3.0 | 3.0 | 3.0 | 3.5 | 4.0 | 4.5 | 5.0 | 5.0 | 5.0 |
| Vulcanizate Properties: | | | | | | | | | |
| Tensile Properties: | | | | | | | | | |
| 100% modulus (MPa) | 3.4 | 4.9 | 5.9 | 6.3 | 6.7 | 4.7 | 4.4 | 3.7 | 3.2 |
| Tensile strength (MPa) | 14.2 | 16.3 | 16.8 | 15.6 | 13.6 | 12.1 | 12.3 | 11.7 | 12.6 |
| Elongation at break (%) | 280 | 260 | 275 | 240 | 210 | 220 | 220 | 230 | 260 |
| Compression set (%) | | | | | | | | | |
| 150° C./70 hr | 31 | 34 | 33 | 31 | 34 | 19 | 17 | 14 | 14 |
| Volume change (%) | | | | | | | | | |
| ASTM #3 oil, 150° C./70 hr | 2 | 3 | 5 | 8 | 13 | 23 | 25 | 26 | 28 |
| Fuel C, 23° C./70 hr | 4 | 6 | 9 | 27 | 51 | 93 | 101 | 105 | 110 |

Example 9

Example 4 was repeated with the addition of a polyol curing agent system. To the formulation given in Table 3 were added 3.0 phr of high activity magnesium oxide, 6.0 phr of calcium hydroxide, 0.7 phr of Curative A, and 1.6 phr of Curative B. Vulcanizate properties given in Table 4 show that a polyol curing agent system for the fluoroelastomer can be used in conjunction with a peroxide curing agent system for a blend of peroxide-curable fluoroelastomer and hydrocarbon elastomer. Properties for Example 4 are repeated in Table 4 to facilitate comparison. In this example, the addition of the polyol curing agent system resulted in a significant reduction in compression set and an increase in modulus.

TABLE 4

| Properties for Example 9 | | |
|---|---|---|
| Vulcanizate Properties: | 9 | 4 |
| Tensile Properties: | | |
| 100% modulus (MPa) | 8.5 | 6.3 |
| Tensile strength (MPa) | 15.2 | 15.6 |
| Elongation at break (%) | 195 | 240 |
| Compression set (%) | | |
| 150° C./70 hr | 22 | 31 |
| Volume change (%) | | |
| ASTM #3 oil, 150° C./70 hr | 9 | 8 |
| Fuel C, 23° C./70 hr | 32 | 27 |

Examples 10–11 and Control D

Fluoroelastomer B was combined with hydrocarbon elastomer A in two blends, one of which also incorporated fluoroelastomer A, in proportions and with other ingredients as shown in Table 5, molded, cured, and tested following the general procedure outlined above. Results in Table 5 show that various fluoroelastomers and blends of fluoroelastomers can be used in the invention.

TABLE 5

| | Examples 10–11 and Control D | | |
|---|---|---|---|
| | D | 10 | 11 |
| Formulation (wt parts): | | | |
| Fluoroelastomer A | — | 35 | — |
| Fluoroelastomer B | 100 | 35 | 40 |
| HC elastomer A | — | 30 | 60 |
| MT carbon black (N-990) | 25 | 35 | 50 |
| Zinc oxide | 3.0 | 3.5 | 4.0 |
| Subst'd diphenylamine | 0.6 | 0.7 | 0.8 |
| Triallylisocyanurate | 1.0 | 1.5 | 1.5 |
| Peroxide | 3.0 | 3.5 | 4.0 |
| Vulcanizate Properties: | | | |
| Tensile Properties: | | | |
| 100% modulus (MPa) | 3.7 | 4.3 | 4.0 |
| Tensile strength (MPa) | 10.4 | 13.2 | 11.0 |
| Elongation at break (%) | 265 | 250 | 245 |
| Compression set (%) | | | |
| 150° C./70 hr | 42 | 39 | 29 |
| Volume change (%) | | | |
| ASTM #3 oil, 150° C./70 hr | 3 | 12 | 20 |
| Fuel C, 23° C./70 hr | 4 | 48 | 78 |

Examples 12–13 and Control E

Fluoroelastomer E was combined with hydrocarbon elastomer B in proportions and with other ingredients as shown in Table 6, molded, cured, and tested following the general procedure outlined above. In this example, the fluoroelastomer is amine-curable but not peroxide-curable while the hydrocarbon elastomer is both amine-curable and peroxide-curable, and an amine curing agent system is used. Results in Table 6 show that blends of amine-curable fluoroelastomers and hydrocarbon elastomers can be used in the practice of this invention. Fluoroelastomer E does not give a practical cure with the curing system listed in Table 6. Typically, metal oxides (e.g., low activity MgO) are used in conjunction with amine curing agent systems for fluoroelastomer E. Remarkably, these metal oxides are not required in the blends with hydrocarbon elastomer as evident from the data in Table 6. The blends have excellent compression set and tensile properties, with values comparable to those of the hydrocarbon elastomer compound Control E. At the same time, the addition of the fluoroelastomer reduces the volume increase in ASTM #3 oil and Fuel C below the values exhibited by Control E.

TABLE 6

Examples 12–13 and Control E

|  | 12 | 13 | E |
|---|---|---|---|
| Formulation (wt parts): |  |  |  |
| Fluoroelastomer E | 63 | 42 | — |
| HC elastomer B | 37 | 58 | 100 |
| SRF carbon black (N-774) | 34 | 45 | 65 |
| Subst'd diphenylamine | 1.5 | 1.7 | 2.0 |
| Stearic acid | 1.1 | 1.2 | 1.5 |
| Octadecylamine | 0.4 | 0.4 | 0.5 |
| Complex organic alkyl |  |  |  |
| acid phosphate | 0.4 | 0.4 | 0.5 |
| Hexamethylenediamine |  |  |  |
| carbamate | 1.9 | 2.1 | 1.5 |
| Di-ortho-tolylguanidine | 4.5 | 3.3 | 4.0 |
| Vulcanizate Properties: |  |  |  |
| Tensile Properties: |  |  |  |
| 100% modulus (MPa) | 6.3 | 7.3 | 7.2 |
| Tensile strength (MPa) | 15.5 | 16.6 | 16.5 |
| Elongation at break (%) | 240 | 220 | 235 |
| Compression set (%) |  |  |  |
| 150° C./70 hr | 47 | 41 | 47 |
| Volume change (%) |  |  |  |
| ASTM #3 oil, 150° C./70 hr | 19 | 25 | 39 |
| Fuel C, 70° C./70 hr | 68 | 83 | 119 |

Examples 14–19

Fluoroelastomer A (80 wt parts) and hydrocarbon elastomer A (20 wt parts) were blended with 25 parts SRF carbon black (N-762), 0.7 part substituted diphenylamine, 3.5 parts triallylisocyanurate, 3.5 parts peroxide, and other additives (metal compound and/or organic base) in proportions as shown in Table 7, then molded, cured, and tested following the general procedure outlined above except that post cure temperature was 175° C. Additionally, cured specimens were aged in a circulating air oven at 175° C. for 4 weeks and then tested. Test results are also presented in Table 7. The beneficial effect of metal hydroxide is shown by smaller changes in 100% modulus, elongation at break, and hardness during oven aging for the compounds containing $Ca(OH)_2$ with or without organic base than for the corresponding compounds without $Ca(OH)_2$.

TABLE 7

Additives and Results for Examples 14–19

|  | 14 | 15 | 16 | 17 | 18 | 19 |
|---|---|---|---|---|---|---|
| Additive (wt parts): |  |  |  |  |  |  |
| Octadecylamine | — | — | 0.3 | 0.3 | — | — |
| 1,8-bis-(dimethylamino)naphthalene | — | — | — | — | 0.3 | 0.3 |
| Calcium hydroxide | — | 3.0 | — | 3.0 | — | 3.0 |
| Vulcanizate Properties, Original: |  |  |  |  |  |  |
| 100% modulus (MPa) | 3.4 | 5.1 | 3.6 | 5.5 | 4.5 | 6.7 |
| Tensile strength (MPa) | 15.1 | 17.0 | 15.0 | 16.8 | 16.3 | 17.7 |
| Elongation at break (%) | 340 | 285 | 290 | 255 | 255 | 230 |
| Hardness (Durometer A) | 68 | 71 | 69 | 71 | 70 | 71 |
| Compression set, o-rings (%) | 33 | 34 | 30 | 39 | 31 | 33 |
| Vulcanizate Properties, Oven-Aged: |  |  |  |  |  |  |
| 100% modulus (% change) | +264 | +68 | +262 | +67 | +178 | +56 |
| Tensile strength (% change) | +6 | −17 | +6 | −10 | −3 | −14 |
| Elongation at break (% change) | −59 | −39 | −52 | −29 | −45 | −33 |
| Hardness (points changed) | +25 | +11 | +24 | +13 | +19 | +13 |

Examples 20–21

Fluoroelastomer A (42 wt parts) and hydrocarbon elastomer A (58 wt parts) were blended with 45 parts SRF carbon black (N-762), 0.8 part substituted diphenylamine, 1.5 parts triallylisocyanurate, 1.5 parts N,N'-m-phenylenedimaleimide, 3.5 parts peroxide, and other additives (metal compound and organic base) in proportions as shown in Table 8, then molded, cured, and tested following the general procedure outlined above except that post cure temperature was 175° C. Test results also presented in Table 8 show that useful properties can be obtained with mixed coagent (triallylisocyanurate and N,N'-m-phenylenedimaleimide), with or without metal compound and organic base.

TABLE 8

Additives and Results for Examples 20–21

|  | 20 | 21 |
|---|---|---|
| Additive (wt parts): |  |  |
| 1,8-bis-(dimethylamino)naphthalene | — | 0.4 |
| Calcium hydroxide | — | 3.0 |
| Vulcanizate Properties, Original: |  |  |
| 100% modulus (MPa) | 4.3 | 5.6 |

TABLE 8-continued

Additives and Results for Examples 20-21

|  | 20 | 21 |
|---|---|---|
| Tensile strength (MPa) | 11.4 | 13.2 |
| Elongation at break (%) | 365 | 290 |
| Hardness (Durometer A) | 74 | 74 |
| Compression set, o-rings (%) | 30 | 29 |

Examples 22-24 and Controls J-K

Fluoroelastomer A was blended with hydrocarbon (HC) elastomer A and other ingredients in proportions as shown in Table 9. The resultant compounds were molded, cured, and tested following the general procedure described above, except that post cure temperature was 175° C. Additionally, press cured samples were aged at 150° C. for 70 hr in a circulating air oven and then tested. Formulations for Example 24 and Controls J-K are based on different fluoroelastomer and hydrocarbon elastomer than in Examples 22-23 and Controls F-I. Controls F-I and J-K also contain minor proportions of NBR elastomer. Controls F-I contain 5 or 20 volume parts of NBR elastomer per 100 volume parts of fluoroelastomer and hydrocarbon elastomer combined, while Controls J-K contain 20 volume parts of hydrocarbon elastomer per 100 parts of fluoroelastomer and NBR elastomer combined. Properties of cured samples of the example and control compositions are also presented in Table 9. As illustrated in Table 9, even minor proportions of NBR elastomer have deleterious effects on the properties of cured elastomeric blend compositions of this invention, most notably after extended high-temperature exposure as in post curing or oven aging. In particular, the presence of NBR elastomer causes sharp increased in compression set and hardness of the cured compositions upon such exposure. This deterioration is attributed to NBR elastomer having low heat resistance.

TABLE 9

Examples 22-24 and Controls F-K

|  | 22 | F | G | 23 | H | I | 24 | J | K |
|---|---|---|---|---|---|---|---|---|---|
| Formulation (wt parts): | | | | | | | | | |
| Fluoroelastomer A | 29.5 | 28.3 | 25.3 | 87.0 | 84.4 | 77.6 | — | — | — |
| Fluoroelastomer F | — | — | — | — | — | — | 89.8 | 87.2 | 78.4 |
| HC elastomer A | 70.5 | 67.7 | 60.5 | 13.0 | 12.6 | 11.6 | — | — | — |
| HC elastomer C | — | — | — | — | — | — | 10.2 | 10.4 | 11.1 |
| NBR elastomer | — | 4.0 | 14.2 | — | 3.0 | 10.8 | — | 2.5 | 10.5 |
| MT carbon black (N-990) | 50 | 50 | 50 | 30 | 30 | 30 | 10 | 10 | 10 |
| Low-activity magnesium oxide | — | — | — | — | — | — | 5.0 | 5.0 | 5.0 |
| Octadecylamine | 0.5 | 0.5 | 0.5 | 0.5 | 0.5 | 0.5 | — | — | — |
| Triallylisocyanurate | 3.0 | 3.0 | 3.0 | 2.0 | 2.0 | 2.0 | 3.0 | 3.0 | 3.0 |
| Peroxide | 3.0 | 3.0 | 3.0 | 3.0 | 3.0 | 3.0 | 2.1 | 2.1 | 2.1 |
| Vulcanizate Properties (press cured): | | | | | | | | | |
| Tensile Properties: | | | | | | | | | |
| 100% modulus (MPa) | 4.2 | 5.0 | 4.1 | 3.4 | 4.6 | 4.8 | 4.0 | 4.6 | 3.7 |
| Tensile strength (MPa) | 11.7 | 11.3 | 10.5 | 12.1 | 12.0 | 10.8 | 12.1 | 13.9 | 13.9 |
| Elongation at break (%) | 240 | 220 | 275 | 290 | 260 | 240 | 335 | 350 | 370 |
| Hardness (durometer A) | 61 | 61 | 63 | 63 | 66 | 68 | 71 | 71 | 68 |
| Compression set (%, 150° C./70 hr) | 86 | 89 | 86 | 59 | 64 | 70 | 51 | 61 | 70 |
| Vulcanizate Properties (post cured): | | | | | | | | | |
| Tensile Properties: | | | | | | | | | |
| 100% modulus (MPa) | 4.7 | 6.0 | 7.7 | 4.2 | 6.0 | 8.5 | 4.8 | 6.3 | 7.9 |
| Tensile strength (MPa) | 12.4 | 11.8 | 11.6 | 13.7 | 13.9 | 13.0 | 14.5 | 14.4 | 14.7 |
| Elongation at break (%) | 240 | 210 | 185 | 295 | 265 | 210 | 340 | 300 | 215 |
| Hardness (durometer A) | 66 | 76 | 83 | 69 | 76 | 84 | 72 | 77 | 79 |
| Compression set (%, 150° C./70 hr) | 20 | 30 | 43 | 37 | 46 | 54 | 33 | 50 | 50 |
| Vulcanizate Properties (over aged): | | | | | | | | | |
| Tensile Properties: | | | | | | | | | |
| 100% modulus (% change) | +41 | +29 | +97 | +24 | +27 | +122 | +38 | +56 | +185 |
| Tensile strength (% change) | +18 | −1 | +6 | +9 | +22 | +20 | +22 | +3 | +15 |
| Elongation at break (% change) | −4 | +2 | −24 | −10 | +2 | −34 | −6 | −25 | −41 |
| Hardness (points changed, Durometer A) | +5 | +16 | +28 | +6 | +8 | +22 | +3 | +8 | +18 |

I claim:

1. A co-curable elastomeric blend consisting essentially of
    (a) at least about 5%, by weight of components (a) and (b), of at least one elastomeric fluoropolymer having at least about 45 weight percent fluorine;
    (b) at least about 5%, by weight of components (a) and (b), of at least one elastomeric copolymer comprising (1) 20–55 percent by weight ethylene and
(2) 45–80 percent by weight of at least one polar comonomer selected from the group consisting of alkyl acrylates, alkyl methacrylates, and vinyl esters wherein the polar comonomer comprises at least 55–80% by weight of the copolymer (b); and (c) at least one curing agent, capable of crosslinking (a) and (b) independently, in an amount effective for crosslinking both (a) and (b);

wherein at least one of (a) and (b) contains about from 0.1 to 10.0% by weight of at least one cure site monomer; provided that if additional elastomeric polymer is present in concentrations exceeding 2 parts by weight based on 100 parts of the combined weight of (a) and (b), the additional elastomeric polymer has heat resistance at least meeting the requirements for Type D rubber materials according to ASTM D-2000.

2. An elastomeric blend of claim 1 wherein the elastomeric fluoropolymer (a) contains about from 0.05 to 2% by weight of bromine.

3. An elastomeric blend of claim 1 wherein the copolymer (b) further comprises 0.1 to 10.0% by weight of at least one alpha, beta-unsaturated carboxylic acid of 3–12 carbon atoms selected from the group consisting of monocarboxylic acids, dicarboxylic acids and monoesters of dicarboxylic acids.

4. An elastomeric blend of claim 1 wherein component (a) contains at least one cure site monomer and about from 0.05 to 2% by weight of bromine, and component (b) contains a cure site monomer.

5. An elastomeric blend of claim 1 wherein the curing agent consists essentially of at least one peroxide curing agent.

6. An elastomeric blend of claim 1 wherein the curing agent consists essentially of at least one amine curing agent.

7. An elastomeric blend of claim 1 comprising at least two curing agents.

8. An elastomeric blend of claim 2 wherein the elastomeric fluoropolymer (a) further comprises at least about 0.001 weight % iodine.

9. The composition of claim 1 wherein the curing agent is an organic peroxide.

10. An elastomeric blend of claim 1 further comprising at least one metal oxide or hydroxide.

11. An elastomeric blend of claim 10 wherein the metal oxide or hydroxide is magnesium oxide or hydroxide or calcium oxide or hydroxide.

12. An elastomeric blend of claim 1 further comprising at least one organic base.

13. An elastomeric blend of claim 10 further comprising at least one organic base.

* * * * *